United States Patent

[11] 3,629,845

[72] Inventors Hamilton C. Chisholm
Los Altos;
Raymond M. Shannon, Cupertino, both of Calif.

[21] Appl. No. 42,969
[22] Filed June 3, 1970
[45] Patented Dec. 21, 1971
[73] Assignee Hewlett-Packard Company
Palo Alto, Calif.

[54] DIGITAL ADJUSTMENT APPARATUS FOR ELECTRONIC INSTRUMENTATION
8 Claims, 2 Drawing Figs.

[52] U.S. Cl. .......... 340/172.5
[51] Int. Cl. .......... G05b 21/00, H03k 19/00
[50] Field of Search .......... 340/172.5, 147, 324.1

[56] References Cited

UNITED STATES PATENTS

| | | | |
|---|---|---|---|
| 3,316,540 | 4/1967 | Nissim | 340/172.5 |
| 3,333,260 | 7/1967 | Olson | 340/172.5 |
| 3,478,317 | 11/1969 | Hales | 340/147 |

*Primary Examiner*—Raulfe B. Zache
*Assistant Examiner*—R. F. Chapuran
*Attorney*—A. C. Smith

ABSTRACT: An electronic instrument for processing signals containing analog information includes a logic circuit which responds to operator-originated digital signals to incrementally alter the values of selected parameters of the signal processed by the instrument.

INVENTORS
HAMILTON C. CHISHOLM
RAYMOND M. SHANNON

BY A. C. Smith
ATTORNEY

INVENTORS
HAMILTON C. CHISHOLM
RAYMOND M. SHANNON
BY
Q. C. Smith
ATTORNEY

DIGITAL ADJUSTMENT APPARATUS FOR ELECTRONIC INSTRUMENTATION

BACKGROUND OF THE INVENTION

Analog-signalling apparatus such as oscilloscopes, signal generators, attenuators, filters, and the like frequently are equipped with control means for altering the value of a parameter of the signal being processed. Advances in circuit miniaturization and complexity and the demand for digital control of circuit operations have created interfacing problems between the circuits and the operator. Conventional control means such as rotary switches, vernier dials, and the like, are becoming impractical as available panel space decreases with advances in miniaturization and as the ranges and operating speeds of the circuits increase.

SUMMARY OF THE INVENTION

Accordingly, the present invention provides digital control means to facilitate operator control of circuit operation. The parameter of a circuit to be controlled is displayed and is manipulated by a digital logic circuit that is commanded by the operator from a digital incrementer on a control panel. In this way, legends for various settings of each circuit parameter to be controlled need not be permanently affixed to the control panel and a single display may be used in connection with the adjustment of several individual circuit parameters.

DESCRIPTION OF THE PREFERRED EMBODIMENT

Figure 1:
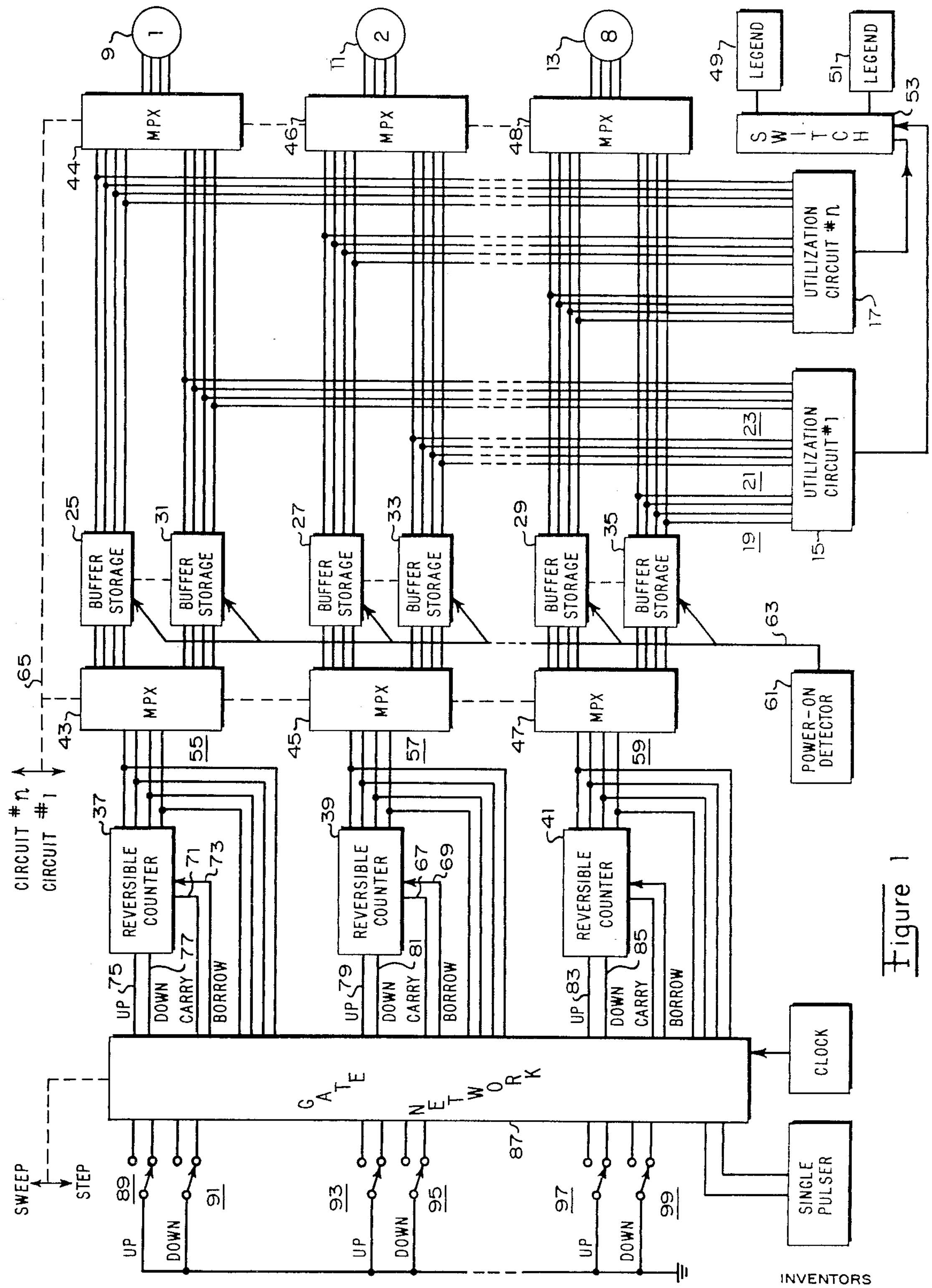
FIG. 1 is a block diagram of the preferred embodiment of the control circuit of the present invention.

Referring now to FIG. 1, there is shown display means 9, 11, 13 for each of a plurality of digits which are used to describe the setting of a parameter of a utilization circuit 15, 17 which is to be adjusted. For example, a cathode-ray oscilloscope having a variable input attenuator and a variable sweep rate generator and variable horizontal and vertical trace-positioning circuits may utilize the present invention to control each of these circuits independently using a single display and operator control for adjusting all circuits separately to desired settings. Thus, one utilization circuit 15 may be the input attenuator including conventional digitally controlled resistor networks, another utilization circuit 17 may be the sweep rate generator including an ordinary digitally controlled resistor network in a conventional resistive-reactive timing circuit, and so on for each function to be controlled. The digital signals are applied to each such utilization circuit 15, 17 in binary-coded decimal or other suitable digitally coded form for each of the digits of the parameter of the circuit to be adjusted. Thus, for an input attenuator circuit 15 having a range of attenuation in excess of 99 decibels (or linear ratio in excess of 99 to 1), the circuit may receive separate digital control signals 19, 21 and 23 per digit for providing independent control of each of the digits representing the value of attenuation. Similarly, another utilization circuit 17 having a parameter such as sweep speed in volts per second or frequency in cycles per second, or the like, which can be represented by a plurality of digits also receives separate digital signals per digit for providing independent control of each of the digits representing the value of sweep speed or frequency, or the like.

The digital control signals per digit of the parameter of the utilization circuit 15, 17 to be controlled are derived from corresponding buffer storage units 25, 27, 29 and 31, 33, 35 per digit. These buffer storage units 25–35 may be conventional slave binaries which are driven by corresponding binaries in a decade counter (or other register) 37, 39, 41 per digit in a manner as later described. Where a plurality of controllable utilization circuits 15, 17 are involved, circuit economies can be realized by using a single counter per digit to drive a buffer storage unit per digit for each utilization circuit in a demultiplexed arrangement, as shown in the drawing. A conventional demultiplexer 43, 45, 47 handling the number of digital signal lines involved is connected between the counter and associated buffer storage units per digit and another conventional multiplexer 44, 46, 48 is connected between the outputs of the buffer storage units and associated display means per digit. These display means 9, 11, 13 may include conventional neon glow-discharge digit indicators or light-emitting diode digit displays and associated decoder and driver circuits for displaying decimal digits in response to the digital control signals generated by the counters 9, 11, 13. In this way, each display digit and associated counter may be multiplexed to control and display the adjustable parameters of a plurality of utilization circuits 15, 17. In addition, a legend 49, 51 designating the units of the adjustable parameter (e.g. volts per second, cycles per second, decibels, etc.) of each utilization circuit 15, 17 may also be included in the display means and be controlled through switch 53 to designate the appropriate units and prefix (e.g. kilo, micro, mega, milli, etc.) of the parameter of the associated circuit 15, 17 being displayed. This multiplexed (or operator-controlled time-share operation) thus enables each circuit parameter to be adjusted and displayed and, thereafter, retained in storage simply by setting the circuit selector 65 to select the particular utilization circuit 15, 17 desired. This gangs together the appropriate input and output multiplexers per digit 43, 44 and 45, 46 and 47, 48 associated with a given buffer storage unit 25–35 for the selected circuit 15, 17. A counter 37, 39, 41 may then drive the corresponding slave binaries in the associated buffer storage units 25–35 and thereby provide the digital control signal output on a digit-by-digit basis for both controlling the selected circuit 15, 17 and displaying the adjusted parameter.

The buffer storage units 25–35 for all of the display digits typically may include slave binary circuits, as previously described, which are conventionally arranged through the four-line connections 55, 57, 59 to assume the operating states of the corresponding binaries in the respective counters 37, 39 and 41. These buffer storage units, however, do not have any memory which can survive a power failure or which may provide repeatable recovery to a given operating state following turnoff and turn-on of the operating power. Accordingly, the circuit of the present invention may include fail-safe reset means which sets the slave binaries in the buffer storage units 25–35 to that combination of operating states for which the utilization circuits 15, 17 thus controlled provide optimum protection or convenience. Thus, for an input attenuator, the optimum condition may be to reset to maximum attenuation and for a sweep speed or a frequency parameter, the optimum condition may be to reset to an arbitrary reference value, say, 100 volts per second or 1 kilocycle per second, respectively. This is accomplished in the present invention using a conventional power-on detector 61 which responds to the turn-on transient present, for example, in the power supply circuitry of the instrument to produce a reset pulse on line 63. This reset pulse may be applied to a selected binary or binaries in each buffer storage unit 25–35 in order to generate a digital code therefrom on the control signal lines 19, 21, 23 to a utilization circuit 15 which adjust the parameter of that circuit to the selected reference value.

The adjustment of the parameter of a utilization circuit 15, 17, whether following turn-on or during the routine operation of an instrument, is provided by incrementing or decrementing the counter 37, 39, 41 associated with a selected digit that represents the value of the parameter being adjusted. For the convenience of bidirectional control of a parameter, conventional reversible counters may be used per digit to provide complete flexibility of adjustment of a parameter directly at the units, tens, hundreds, thousands, etc. place in the value of the parameter. A parameter (having only three digit-places, as shown, for illustrative purposes) may thus be incremented or decremented directly through a typical sequence, as follows:

000
010

110
100
099
089
090
100
200
201
211 etc.

The series of reversible counters 37, 39, 41 are tied together in incremental or (e.g. cascade in a conventional manner through Carry and Borrow lines 67, 69 and 71, 73 to provide one-step transitions in the units, tens, hundreds, etc. places, as indicated above (e.g., 200 201, 089 090, 100 099, 000 010, etc.). Special circuitry, however, as later described, may be necessary to prevent transitions such as from 000 to 999 or from 999 to 000, or the like. As may be apparent in connection with control of a power supply according to the present invention, an inadvertent transition through 000 to 999 may destroy a circuit or device powered thereby and an attenuator controlled through the transition of 999 to 000 may permit destruction of apparatus receiving attenuated applied signal.

Figure 2:
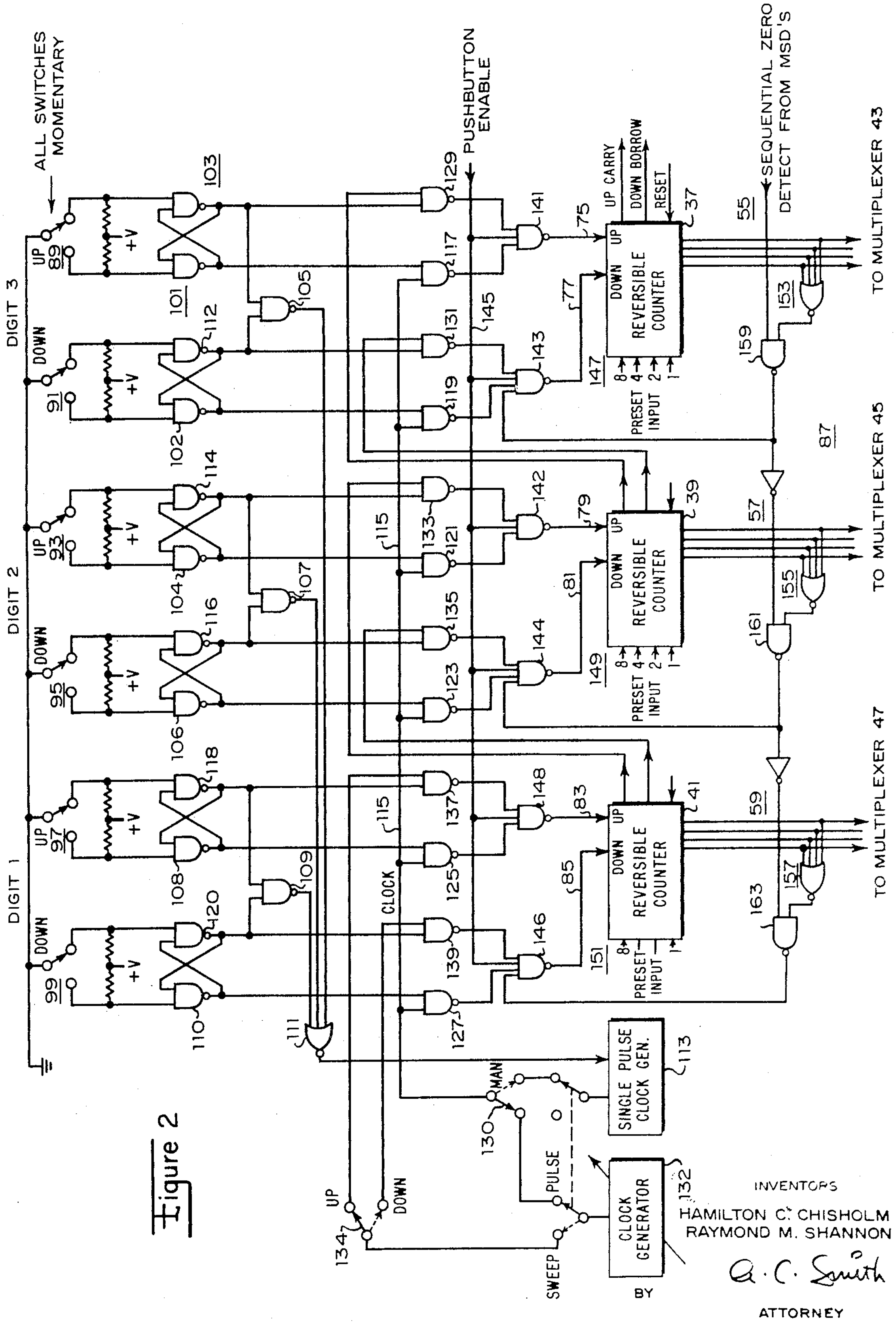
FIG. 2 is a block diagram of a preferred embodiment of the gate network of FIG. 1.

Reversible counters suitable for operation in the present invention are described in the literature (see, for example, U.S. Pat. No. 3,407,288 issued on Oct. 22, 1968, to Ralph R. Reiser or U.S. Pat. No. 3,054,001 issued on Sept. 11, 1962, to H. Chisholm). Such conventional reversible counters typically include separate up-counting and down-counting pulse inputs 75, 77 (or 79, 81 or 83, 85). The pulses for independently incrementing or decrementing these counters 37, 39, 41 through their decadic ranges are generated under the operator's control in accordance with the present invention using a gate network 87, for example, as shown in FIG. 2. This gate network 87 includes a pair of manual switches (for up- and for down-stepping) 89 and 91, 93 and 95, 97 and 99 per digit, each connected in a conventional gate arrangement which provides only one pulse per switch closure, independent of any contact bounce upon switch closure. By way of example and with reference to the switches 89 and 91 for the most significant digit counter 37, a switch 89 is connected to a pair of cross-coupled NAND-gates 101, 103 for providing only one transition in the outputs of the NAND gates per manual setting of the switch 89 to a contact position. Outputs of the NAND gates for the UP and DOWN switches 89 and 91, respectively, are applied to a NAND-gate 105, and the outputs of this and corresponding NAND-gates 107, 109 for the remaining pairs of switches are applied to NOR-gate 111 which, in turn, applies a pulse to the single pulse clock generator 113 upon each manual operation of a switch 89–99. The generator 113 thus produces a single clock pulse per switch operation and this clock pulse appears on line 115 when the selector switch 130 is in the MANual position. The single clock pulse is applied to a NAND-gate 117–127 in each of the UP and DOWN cross-coupled gating circuits per digit where it is gated through for the proper output from the corresponding NAND-gate 101, 102–110). A NAND-gate 129–139 in the other output line of the cross-coupled gating circuits per digit receives either the carry signal from a preceding digit counter (for the UP-stepping gating network 101–103, etc.) or a borrow signal for the preceding digit counter (for the DOWN-stepping gating network 102–112, etc.). The single clock pulse per operation of the UP-stepping switch and a carry signal from a preceding digit counter are applied to the NAND-gate 141 in the UP-counting input 75 of the corresponding digit counter 37, and the single clock pulse per operation of the DOWN-stepping switch and a borrow signal for the preceding digit counter are applied to a NAND-gate 143 in the DOWN-counting input 77 of the corresponding digit counter 37. An enabling signal on line 145 is applied to the gates 141–143, etc., in the UP and DOWN input 75–85 of the digit counters by means (not shown) only when the selector switch 130 is in the MANual position to avoid inadvertent manual setting of the digits when automatic or preset operation (using preset inputs 147–151 per digit counter) is desired.

Each of the digit counters is manually controlled by its corresponding UP and DOWN switches in a manner similar to that described.

Automatic sweeping through the digits per significant digit place may be accomplished according to the present invention by applying recurring clock pulse from generator 132 to the gates 137 and 139 of, say, the least significant digit counter 41. This applies recurring clock pulses at a selectable rate of, say, 1 kilohertz to the first-place digit counter which then counts up or down depending on the setting of switch 134. The counter 41 produces a carry signal for each decadic recycling from 9 to 0 (or a borrow signal for recycling from 0 to 9) and this signal is applied to the succeeding counter 39 to increment (or decrement for a borrow signal) the counter in the usual manner. In this way, the range of digits may be conveniently swept or manually controlled limits in unit steps (or tens or hundreds, etc. steps, depending on which digit-place counter first receives the recurring clock pulses).

In accordance with the present invention, nonrecycling logic control is provided to prevent transitions, for example, from 000 to 999 for reasons as previously described. The output lines of each digit counter are connected to a NOR-gate 153, 155, 157 to detect the four-line coded condition of 0 (or 9) and the output of this gate 153, 155, 157 is combined in NAND gate with the output from the gates of a preceding more-significant digit counter (or with a fixed logic signal for the most-significant digit counter). This output from the gates for each digit counter is also applied to the gate 143, 144, 146 in the DOWN-counting input of the corresponding digit counter in order to inhibit further decrementing of the counter below 0 (or for 9-sensing, the output of similar gates is applied to the gate 141, 142, 148 in the UP-counting input of the corresponding digit counter in order to inhibit further incrementing of the counter above 9). Each NAND-gate 161, 163 for consecutively less-significant digit counters thus becomes enabled in turn in response to the succeeding more-significant digit counter attaining 0 for preventing further decrementing below 000 (or, for 9-sensing, similar gates may be activated consecutively in response first to the most-significant digit counter attaining 9, then second to the next most-significant digit counter attaining 9, etc., for preventing further incrementing about 999).

Therefore, the present digital adjustment apparatus for electronic equipment provides not only the circuit control flexibility commonly associated with multiposition mechanical range switches but also provides convenient digital sweep capability using only pushbuttons and digit displays on the control panel of the equipment. Also, inadvertent range transitions are avoided by circuitry which detects the range end limits and inhibits further overrange adjustment.

What is claimed is:

1. Digital control apparatus for a selected parameter of an electrical device, the apparatus comprising:

a digital register for each of the digits of a selected parameter of an electrical device to be controlled, each register having a plurality of outputs and each having a plurality of operating states represented by output signals on selected ones of the outputs thereof, said digital register being operable to change operating states once per input applied thereto through a sequence of the plurality of operating states;

means connected to the plurality of outputs of each of said digital registers for controlling the digits of a selected parameter of an electrical device coupled thereto in response to signals appearing at the outputs of each of said digital registers;

pulse-gating means connected to said digital registers and including manually operable control means for selectively applying inputs to said digital registers to alter the operating states thereof in sequence; and indicator means for each digital register coupled to the outputs of the corresponding digital register for providing an output indication of the operating state of the digital register.

2. Digital control apparatus as in claim 1 wherein said pulse-gating means includes a manually operable switch for each digital register and includes circuit means responsive to actuation of said manually operable switch for producing and applying to the input of a corresponding digital register one, one pulse per operation of said switch.

3. Digital control apparatus as in claim 2 wherein:

said digital register includes a pair of inputs and change-operating states through one sequence of the plurality thereof in response to recurring pulses applied to one of said pair of inputs, and changes operating states through a sequence opposite to said one sequence in response to recurring pulses applied to the other of said pair of inputs;

said pulse-gating means includes a pair of manually operable switches for each of said digital registers, and said circuit means responds to actuation of one of said pair of switches to produce and apply to one of said inputs of the corresponding digital register only one pulse per operation of said one switch, and also responds to actuation of the other of said pair of switches to produce and apply to the other of said inputs the corresponding digital register only one pulse per operation of the other of the pair of switches.

4. Digital control apparatus as in claim 1 for selectively controlling the parameters of a plurality of electrical devices, the apparatus comprising:

for said means connected to the plurality of output of each of said digital registers, a multiplexing means having a group of inputs connected to the outputs of the corresponding digital register and having a plurality of groups of outputs selectably connectable as a group to the group of inputs;

a plurality of storage register means each having a plurality of inputs and each being operable in a plurality of operating states in response to signals applied to the inputs thereof;

means coupling the inputs of each of said storage register means to the corresponding outputs of said multiplexing means for establishing the operating state thereof in response to the signals applied to the inputs thereof from the corresponding group of outputs of said multiplexing means; and detecting means coupled to said storage register means for establishing predetermined operating states therein in response to energization of the controlled electrical device.

5. Digital control apparatus as in claim 1 comprising:

digit-gating means coupled to the outputs of each of said digital registers and to the pulse-gating means for inhibiting further application of pulses to an input of a digital register in response to a selected logic combination of the outputs of said digital registers attaining values representative of a predetermined limit of the selected parameter of an electrical device to be controlled.

6. Digital control apparatus as in claim 5 wherein:

said digit-gating means includes a first gate coupled to the outputs of a selected digital register for producing one output in response to an operating state of the selected digital register which represents a digit at a limit of the range of digits covered by the selected digital register and produces another output for other operating states of the selected digital register; and a second gate coupled to receive the output of the first gate and a signal indicative of the operation of an adjacent digital register in an operating state representative of a digit at a limit of the range of digits covered by the adjacent digital register for inhibiting further application of pulses to an input of the selected digital register.

7. Digital control apparatus as in claim 6 wherein:

said selected digital register includes a pair of inputs and the digital register changes operating states through one sequence of the plurality thereof in response to pulses recurringly applied to one of said pair of inputs, and changes operating states through a sequence opposite said one sequence in response to pulses recurringly applied to the other of said pair of inputs; and said digit-gating means including said first gate responds to the outputs of a digital register attaining values indicative of a zero-digit operating state for inhibiting said pulse-gating means from applying further pulses to the input of said digital register which tends to change the operating state thereof in the sequence that tends to decrement below the zero-digit operating state.

8. Digital control apparatus as in claim 1 comprising:

a plurality of said digital registers disposed to represent the successively significant digits of a parameter of an electrical device to be controlled, each digital register being capable of operating through a sequence of operating states representative of digits in a range of digits in response to pulses recurringly applied to an input thereof and being disposed to produce an output signal indicative of a change in operating states from a digit at one limit of a range thereof to a digit at the other limit of the range;

said pulse-gating means including said manually operable control means is connected to apply said recurring pulses to an input of a digital register only during manual operation of said control means; and said pulse-gating means further couples said output signals of one digital register to an input of an adjacent digital register in response to a change in operating states between end limits of the range of digits indicated thereby, whereby a plurality of digital registers may be swept through the operating states thereof which represent a sequence of digits over a range of values in response to manual operation of said control means.

* * * * *

UNITED STATES PATENT OFFICE
CERTIFICATE OF CORRECTION

Patent No. 3,629,845 Dated December 21, 1971

Inventor(s) Hamilton C. Chisholm and Raymond M. Shannon

It is certified that error appears in the above-identified patent and that said Letters Patent are hereby corrected as shown below:

Column 2, line 1, after "circuit" insert -- involved --;

Column 3, line 11, "incremental or (e.g. cascade" should read -- incremental or decremental cascade --;

Column 3, line 14, "(e.g., 200 201, 089 090, 100 099, 000 010," should read -- (e.g., 200→201, 089→090, 100→099, 000→010, --;

Column 3, line 57, "102-110)." should read 102-110. --.

Signed and sealed this 13th day of June 1972.

(SEAL)
Attest:

EDWARD M.FLETCHER,JR.
Attesting Officer

ROBERT GOTTSCHALK
Commissioner of Patents

FORM PO-1050 (10-69)
-160010

USCOMM-DC 60376-P69
☆ U.S. GOVERNMENT PRINTING OFFICE : 1969 O—366-334